(No Model.)

W. H. TAYLOR.
KNOB ATTACHMENT.

No. 253,956.  Patented Feb. 21, 1882.

WITNESSES

Wm A. Skinkle

Ernest Abshagen

INVENTOR

Warren H. Taylor,

By his Attorneys

Baldwin, Hopkins, & Peyton.

UNITED STATES PATENT OFFICE.

WARREN H. TAYLOR, OF STAMFORD, CONNECTICUT, ASSIGNOR TO THE YALE LOCK MANUFACTURING COMPANY, OF SAME PLACE.

KNOB ATTACHMENT.

SPECIFICATION forming part of Letters Patent No. 253,956, dated February 21, 1882.

Application filed October 11, 1881. (No model.)

*To all whom it may concern:*

Be it known that I, WARREN H. TAYLOR, of Stamford, in the county of Fairfield and State of Connecticut, have invented certain new and useful Improvements in Knob Shank and Spindle Appliances, of which the following is a specification.

The object of my invention is to improve that class of door-fastenings in which a knob-shank is provided with a tapering end, and with two or more slots, around which is fitted a tapering sleeve, which by screw action clamps the parts of the shank firmly upon the spindle in any adjusted position, whereby the use of washers to accommodate different thicknesses of doors is dispensed with. One form of such a device is shown, for example, in English Patent No. 1,490 of 1878.

My invention consists merely in the combination, with a knob-spindle, screw-threaded knob-shank, and screw-threaded sleeve, of a washer fitted upon and turning with the spindle to prevent such frictional contact with the sleeve as might tend to unscrew it and release the gripe of the shank upon the spindle.

In order to show the nature and advantage of my improvement fully I have illustrated and will proceed to describe a complete door-knob and knob-shank spindle and rose as applied to a door in connection with my improvement, and of a kind to which my improvement is applicable beneficially.

Figure 1:
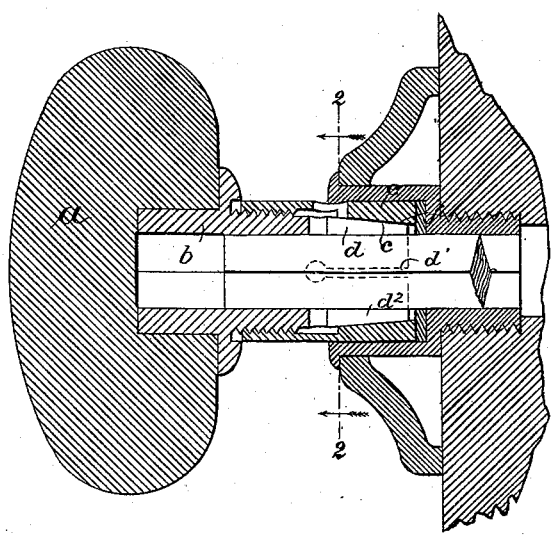
Figure 2:
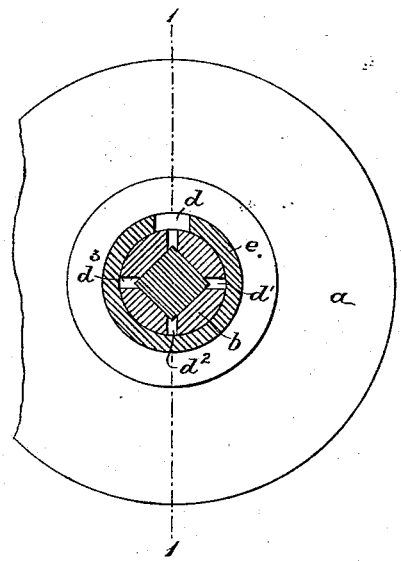
Figure 3:
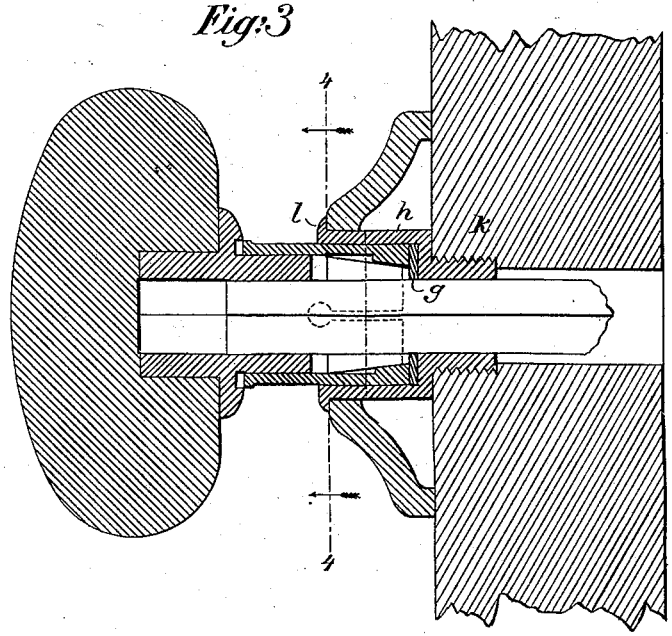
Figure 4:
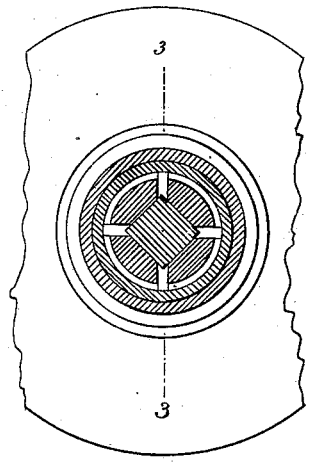

In the accompanying drawings, Figure 1 is a longitudinal section of a knob, knob-shank, and sleeve, showing the spindle in elevation. Fig. 2 is a cross-section of the same on line 2 2 of Fig. 1. Figs. 3 and 4 represent a modification in the form of this device, Fig. 3 being a longitudinal section of a knob, knob-shank, and sleeve, showing the spindle in elevation, and a central section of a rose and rose-fastenings, the whole applied to a door. Fig. 4 is a cross-section of the same on the line 4 4 of Fig. 3.

$a$ indicates a knob, to which a shank, $b$, is secured in any suitable manner. This shank is screw-threaded upon its circumference near its junction with the knob, and is tapered at its inner end, as at $c$, and provided with two or more longitudinal slots (preferably four) extending from the spindle-socket radially outward, as shown at $d$ $d'$ $d^2$ $d^3$. Fitting around the outside of the shank is an internally screw-threaded sleeve, $e$, tapering on its interior at $f$ to correspond with the taper $c$ of the knob-shank. The spindle being inserted in its socket within the shank and adjusted to place, the sleeve $e$ is then screwed up tightly toward the knob, which causes it to clamp the tapering segmental sections of the shank between the slots $d$ $d'$ $d^2$ $d^3$, pressing them by a wedging action with great force inward upon the sides of the spindle and firmly securing it.

The modification shown in Figs. 3 and 4 is constructed and operates precisely in the same manner, except that instead of having a screw by which to cause the sleeve to travel upon the shank toward the knob the screw is omitted, and when the parts are properly adjusted the knob may be hit a smart blow, which will drive the shank within the sleeve and cause it to be clamped by the sleeve upon the spindle, as above set forth.

Coming now to the precise matter of my improvement in connection with the above-described devices, I provide a washer, $g$, having a square hole, so that it will fit on and always turn with the spindle. I apply this washer on the spindle next the inner end of the sleeve and shank, because in the absence of such a washer, in case the rose-thimble $h$ should be unscrewed—as might possibly happen—and drawn out of place and strike against the end of the sleeve, the frictional contact with the sleeve would tend to unscrew it and release the gripe of the shank upon the spindle. By employing the washer as I do this difficulty is obviated, because the washer, bearing against the inner end of the sleeve, always turns with the sleeve, and therefore has no tendency to unscrew it and thus release the gripe of the shank upon the spindle. The washer should be thin enough, so that ordinarily it will not bear strongly against either the thimble or the end of the shank or sleeve.

Having thus described my invention, what I claim as new, and desire to secure by Letters Patent, is—

The combination, with a spindle, screw-threaded shank, and screw-threaded sleeve, of a washer fitting upon and turning with the spindle and extending between the end of the sleeve and shank and the surface of the rose or thimble, substantially as and for the purpose specified.

In testimony whereof I have hereunto subscribed my name this 13th day of August, A. D. 1881.

WARREN H. TAYLOR.

Witnesses:
  GEO. E. WHITE,
  SCHUYLER MERRITT.